b

(12) United States Patent
Sasaki et al.

(10) Patent No.: US 11,198,793 B2
(45) Date of Patent: Dec. 14, 2021

(54) AQUEOUS COATING AGENT COMPOSITION AND A COATING COMPOSITION FOR AN AQUEOUS LUBRICATING FILM COMPRISING THE SAME

(71) Applicant: Dupont Toray Specialty Materials Kabushiki Kaisha, Tokyo (JP)

(72) Inventors: Takahiko Sasaki, Tochigi (JP); Tetsuji Yamaguchi, Tochigi (JP); Kazuhiko Kojima, Chiba (JP)

(73) Assignee: Dupont Toray Specialty Materials Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/634,285

(22) PCT Filed: Jul. 9, 2018

(86) PCT No.: PCT/JP2018/025847
§ 371 (c)(1),
(2) Date: Jan. 27, 2020

(87) PCT Pub. No.: WO2019/021794
PCT Pub. Date: Jan. 31, 2019

(65) Prior Publication Data
US 2020/0157379 A1 May 21, 2020

(30) Foreign Application Priority Data
Jul. 28, 2017 (JP) .............................. JP2017-146009

(51) Int. Cl.
| C09D 183/04 | (2006.01) |
| C09D 7/65 | (2018.01) |
| C09D 7/61 | (2018.01) |
| C09D 7/63 | (2018.01) |
| C09D 5/02 | (2006.01) |
| C10M 177/00 | (2006.01) |
| C10N 50/00 | (2006.01) |
| C10N 60/00 | (2006.01) |

(52) U.S. Cl.
CPC ............ *C09D 183/04* (2013.01); *C09D 5/02* (2013.01); *C09D 7/61* (2018.01); *C09D 7/63* (2018.01); *C09D 7/65* (2018.01); *C10M 177/00* (2013.01); *C10N 2050/025* (2020.05); *C10N 2060/00* (2013.01)

(58) Field of Classification Search
CPC .......... C09D 183/04; C09D 7/65; C09D 7/61; C09D 7/63; C09D 5/02; C10M 177/00; C10N 2050/025; C10N 2060/00
See application file for complete search history.

(56) References Cited

U.S. PATENT DOCUMENTS

| 5,477,918 A | * | 12/1995 | Grulke | ..................... C08J 3/215 106/2 |
| 9,011,586 B2 | * | 4/2015 | Kruse | ..................... C09D 5/10 106/14.14 |
| 9,029,428 B2 | | 5/2015 | Kojima et al. | |
| 2017/0349762 A1 | * | 12/2017 | Sasaki | ..................... C09D 5/02 |

FOREIGN PATENT DOCUMENTS

| CN | 102959016 A | 3/2013 | |
| JP | 2002-038014 A | 2/2002 | |
| JP | 2004-083741 A | 3/2004 | |
| WO | 2016/098336 A1 | 6/2016 | |
| WO | WO-2016098336 A1 * | 6/2016 | .......... C10M 107/44 |

OTHER PUBLICATIONS

International Search Report of the International Searching Authority for PCT/JP2018/025847 dated Aug. 14, 2018.
English Translation of International Search Report of the International Searching Authority for PCT/JP2018/025847 dated Aug. 14, 2018.
State Intellectual Property Office of People's Republic of China: Search Report for CN-PCT/201880056439.2 Application with an Examiner dated Jan. 18, 2021.
China National Intellectual Property Administration: The First Office Action issued in Chinese Application CN-PCT/201880056439.2 dated Jan. 22, 2021, 3 pages.
"Silicone Finishing Agent with Antisqueak Performance", "Silicone Material", Huang Wei, vol. 30, No. 03, p. 229-232 May 25, 2016. English language abstract embedded in document text on p. 232.

* cited by examiner

*Primary Examiner* — Cephia D Toomer
(74) *Attorney, Agent, or Firm* — Lorenz & Kopf, LLP

(57) ABSTRACT

[Problem] To provide an aqueous coating agent composition (in particular, an aqueous coating composition for lubricating films that contains a solid lubricant) which as a whole is excellent in terms of flowability, applicability, and storage stability and which is capable of forming satisfactory and smooth coating films effective in stick-slip inhibition. [Solution] The problem can be solved with an aqueous coating agent composition which comprises (A) a curable resin in an aqueous emulsion form, (B) a surfactant, (C) solid particles, (D) one or more nitrogenous heterocyclic compounds, (E) a film-forming silicone in an aqueous emulsion form, and (F) water. In particular, it is preferable that the (C) component comprise a solid lubricant. In view of the environmental regulations, it is especially preferable that the (D) component be 1,3-dimethyl-2-imidazolidinone.

19 Claims, No Drawings

AQUEOUS COATING AGENT COMPOSITION AND A COATING COMPOSITION FOR AN AQUEOUS LUBRICATING FILM COMPRISING THE SAME

TECHNICAL FIELD

The present invention relates to an aqueous coating agent composition. Furthermore, the present invention relates to an application of the aforementioned aqueous coating agent composition in the form of a coating composition for an aqueous lubricating film.

BACKGROUND ART

Aqueous coatings or aqueous coating agents obtained by dispersing or emulsifying a curable resin in water (hereafter, referred to as an "aqueous coating agent") contain an organic solvent as a film-forming auxiliary agent such that film formation occurs even at low temperature. In such aqueous coating agent compositions, the curable resin is often dispersed or emulsified in the form of an emulsion, and a pigment or solid lubricant in the form of a powder, paste or dispersion is mixed in to stabilize the powder, and a surfactant may be added to prevent precipitation. Said aqueous coating agents are applied to a substrate such as metal, rubber or plastic, and cured to obtain a member having a target coating film functionality.

For example, Patent Documents 1 through 4 disclose methods for forming a lubricating film on the surface of a metal substrate—specifically, an element tube cold tube drawing process—in which a lubricating film is formed, wherein a composition obtained by dispersing or suspending fine particles or wax particles corresponding to a curable resin such as polyacrylic resin or a solid lubricant, etc., in a water-containing solvent using a surfactant is applied to an element tube which is then passed through a 60 to 150° C. drying zone, etc., to form a lubricating film on top of the element tube. Additionally, Patent Documents 1 through 4 disclose that it is preferable to use water or a solvent containing at least water in order to form a tough resin layer, providing as examples of non-water solvents, alcohols, ether solvents, acetate solvents, ketone solvents, hydroxyamines and dimethyl sulfoxide, and providing as examples of solvents containing at least water, mixed solvents composed of water and the aforementioned non-water solvents, such as water-alcohol solvents composed of water and the aforementioned alcohols, etc. Note that surfactant is an optional component for dispersing the aforementioned resin and the wax particles, and dodecylbenzene sulfonate, etc., are not specifically disclosed.

Meanwhile, in Patent Document 5, the present applicant proposes an aqueous coating agent composition containing at least one nitrogen-containing heterocyclic compound (such as 1,3-dimethyl-2-imidazolidinone), for the purposes of providing an aqueous coating agent composition capable of forming a favourable coating film, wherein a solvent that enables product design in compliance with European environmental regulations and which does not have any negative effects on the environment or the human body is used to inhibit interaction between the curable resin and surfactant, inhibiting thickening, gelling or non-uniformity throughout the aqueous coating agent and improving overall fluidity, coatability and storage stability. Additionally, in Paragraph [0065] of said document, the applicant explains that any solid particles which include a silicone elastomer powder, such as "TREFIL," etc., can be used and in Paragraph [0082] the applicant explains that any silicone gum can be used.

However, although the aqueous coating agent described in Patent Document 5 shows excellent fluidity, coatability and storage stability, when it is used as a coating composition for an aqueous lubricating film for the purposes of forming a lubricating coating film on top of a member, there remains room for further improvement in terms of the abrasion resistance, lubricating properties, and smoothness of the film.

Meanwhile, in Patent Document 6 and Patent Document 7, the applicant proposes an oil-in-water type silicone emulsion composition for the purposes of forming an elastic film comprising silicone rubber on top of a substrate. However, none of the above documents describes or suggests the use of these emulsion compositions as additives in other functional coating agents, or technical effects associated with said addition.

PRIOR ART DOCUMENTS

Patent Documents

[PATENT DOCUMENT 1] Japanese Unexamined Patent Publication No. 2007-268580
[PATENT DOCUMENT 2] Japanese Unexamined Patent Publication No. 2007-268584
[PATENT DOCUMENT 3] Japanese Unexamined Patent Publication No. 2007-268587
[PATENT DOCUMENT 4] Japanese Unexamined Patent Publication No. 2006-143988
[PATENT DOCUMENT 5] International Patent Publication No. 2016/098336 Pamphlet
[PATENT DOCUMENT 6] Japanese Unexamined Patent Publication No. 2010-235931 (Special Registration 5698915)
[PATENT DOCUMENT 7] International Patent Publication No. 2012/002571 Pamphlet (Special Registration 5848704)

SUMMARY OF THE INVENTION

Problems to be Solved by the Invention

Furthermore, the present applicant has identified a new problem following a study of the abrasion resistance, lubricating properties, and film smoothness of the aqueous coating agent film specified in Patent Document 5. That is, in the field of lubricating coating film, reducing the difference ($\Delta\mu$) between the static and dynamic friction coefficients is effective for improving stick-slip properties, but for generally known aqueous coating agents, even when the solid lubricant and the binder resin are adjusted, said improvement in $\Delta\mu$ is limited, and it is not possible to provide a lubricating coating film showing particularly excellent stick-slip properties. Furthermore, there remains further room for improvement in terms of the film abrasion resistance (durability) of known coating films, and there are also issues in terms of the smoothness of the coating, including the possibility that pinholes may be generated on the surface of the coating film upon curing.

The present invention is intended to solve the above problems and seeks to provide an aqueous coating agent composition which includes a curable resin emulsified or dispersed in water and a surfactant designed to disperse solid particles uniformly in water, and which exhibits superior film abrasion resistance while maintaining good overall fluidity, coatability and storage stability as well as a small static/dynamic friction coefficient differential, expressed as Δμ, and which provides a coating film which shows superior smoothness, where pinholes, etc., do not readily form on the film.

Furthermore, the present invention seeks to use a solid lubricant as at least a part of the solid particles to form a film showing high adhesion and a low coefficient of friction on the surface of various substrates via drying, etc. and also having sliding characteristics in the form of wear resistance which are better than conventional products, thereby providing a coating composition for an aqueous lubricating film capable of forming a lubricating film capable of maintaining excellent sliding characteristics, including improved stick-slip characteristics, for a long period of time.

Means for Solving the Problems

In order to solve the aforementioned problems, the inventors of the present invention conducted extensive studies and as a result discovered that it is possible to solve the aforementioned problems via the addition of (E) a film-forming silicone in the form of an aqueous emulsion to an aqueous coating agent composition containing (A) a curable resin in the form of an aqueous emulsion, (B) a surfactant, (C) solid particles and (D) one or more types of nitrogen-containing heterocyclic compounds. Furthermore, the inventors of the present invention discovered that when a solid lubricant is included as at least part of Component (C), the lubricating film formed on the substrate surface using said composition has a small static/dynamic friction coefficient differential (AO and shows superior wear resistance and surface smoothness as well as superior sliding durability, thereby arriving at the present invention.

That is, the first object of the present invention is achieved via an aqueous coating agent composition which contains:
(A) A curable resin in the form of an aqueous emulsion,
(B) A surfactant,
(C) Solid particles,
(D) One or more types of nitrogen-containing heterocyclic compounds,
(E) A film-forming silicone in the form of an aqueous emulsion, and
(F) Water.

The aqueous coating agent composition constituted by the present invention should preferably include 0.1 to 50 parts per mass of Component (B) specified above, 5 to 200 parts per mass of Component (C) specified above, 1 to 20 parts per mass of Component (D) specified above, 0.1 to 10 parts per mass of the solid component of Component (E) specified above, and 50 to 1,000 parts per mass of Component (F) specified above per 100 parts per mass of the solid component of Component (A) specified above prior to curing.

In the aqueous coating agent composition constituted by the present invention, Component (E) should preferably correspond to a film-forming silicone in the form of an aqueous emulsion comprising 100 parts per mass of (Ea) a polyorganosiloxane having at least two hydroxyl groups or hydrolyzable groups bonded to a silicon atom per molecule, 0.1 to 200 parts per mass of (Eb) colloidal silica, 1 to 100 parts per mass of (Ec) ionic surfactant, 0 to 50 parts per mass of (Ed) nonionic surfactant and 10 to 5,200 parts per mass of (Ef) water. Note that the nonionic surfactant corresponding to Component (Ed) is an optional component.

Here, the polyorganosiloxane corresponding to Component (Ea) should preferably correspond to a polyorganosiloxane having at least two (Ea-1) groups selected from a set comprising a hydroxyl group, an alkoxy group and an alkoxyalkoxy group bonded to a silicon atom and the nonionic surfactant corresponding to Component (Ed) should preferably correspond to (Ed-1) a polyoxyethylene-polyoxypropylene copolymer-type nonionic surfactant, while it is particularly preferable that the colloidal silica corresponding to Component (Eb) be in the form of an aqueous dispersion having a pH of 7.0 or greater which is stabilized with alkali metal ions, ammonium ions or an amine.

Said film-forming silicone in the form of an aqueous emulsion should furthermore preferably include 0.1 to 100 parts per mass of (Eg) an aminoxy group-containing organosilicon compound having an aminoxy group bonded to a silicon atom, 0.1 to 50 parts per mass of (Eh) an alkoxysilane or alkoxyalkoxysilane or a partially hydrolyzed condensate of the aforementioned alkoxysilane or alkoxyalkoxysilane, as expressed by the formula $R_aSiX_{4-a}$ (where R corresponds to an unsubstituted monovalent hydrocarbon group or a substituted monovalent hydrocarbon group, X corresponds to an alkoxy group or an alkoxyalkoxy group, and a corresponds to 0, 1, or 2), as well as (Ei) one or more elements selected from a set of amine compounds (pH adjusters). Note that, in the emulsion, it is possible, and furthermore preferable, for the aminoxy group-containing organosilicon compound corresponding to Component (Eg) to exist in the emulsion in a form obtained after it has reacted with a polyorganosiloxane having at least two hydroxyl groups or hydrolyzable groups bonded to a silicon atom per molecule corresponding to Component (Ea).

In the aqueous coating agent composition constituted by the present invention, Component (D) specified above may correspond to a nitrogen-containing heterocyclic compound represented by any one of Structural Formulas (D-1) through (D-3) given below.

[Chemical Formula 1]

(D-1)

(D-2)

(D-3)

(Where $R^1$ corresponds to a hydrogen atom or alkyl groups each independently having 1 to 9 carbon atoms, and n is a number ranging from 1 to 10)

More preferably, Component (D) should correspond to one or more types of nitrogen-containing heterocyclic compounds selected from 1,3-dimethyl-2-imidazolidinone, N-methyl-2-pyrrolidone, N-ethyl-2-pyrrolidone, N-methyl-3-methyl-2-pyrrolidone, cyclohexylpyrrolidone, 2-oxazolidone, and 3-methyl-2-oxazolidone.

In particular, when Component (B) contains an anionic surfactant different from the surfactant used to form the emulsion of Component (A), Component (D) should preferably correspond to 1,3-dimethyl-2-imidazolidinone.

Component (A) should more preferably correspond to a polyacrylic resin, polyurethane resin, polyolefin resin, epoxy resin, silicone resin or polyamideimide resin, a modified product thereof, or a mixture thereof in the form of an aqueous emulsion.

Component (C) should preferably contain a solid lubricant selected from fluorine resin, polyethylene resin, polyamide resin, molybdenum disulphide, graphite, aluminum oxide, boron nitride, zinc oxide and mixtures thereof. When said component contains such a solid lubricant, the aqueous coating agent composition constituted by the present invention can be suitably used as a coating composition for an aqueous lubricating film.

Effects of the Invention

The aqueous coating agent constituted by the present invention provides a coating film in which interaction between the curable resin in the form of an aqueous emulsion and the surfactant added to disperse solid particles is inhibited, inhibiting thickening, gelling or non-uniformity throughout the aqueous coating agent and improving overall fluidity, coatability and storage stability, and wherein the wear resistance of the film is excellent, the static/dynamic friction coefficient differential, expressed as $\Delta\mu$, is small and the film shows superior smoothness, where pinholes, etc., do not readily form on the film. As a result, the aqueous coating agent constituted by the present invention can be stored for a long period of time, and can form a coating film which is uniform and exhibits superior physical film properties as well as excellent adhesion to a substrate.

Furthermore, the present invention seeks to use a solid lubricant as at least a part of the solid particles to form a film showing high adhesion and a low coefficient of friction on the surface of various substrates via drying, etc. and also having sliding characteristics in the form of wear resistance which are better than conventional products, thereby providing a coating composition for an aqueous lubricating film capable of forming a lubricating film capable of maintain excellent sliding characteristics, including improved stick-slip characteristics, for a long period of time.

Note that since Component (D) also corresponds to a component that functions as a film-forming auxiliary agent, a tough resin layer can be formed more easily compared to known aqueous coating agent compositions, potentially improving the physical strength and adhesion of the coating film or lubricating film as well as improving production efficiency. On the other hand, unlike solid particles, etc., Component (E) is an additive component capable of forming a uniform and tough silicone rubber elastic film, but the incorporation of said component achieves better wear resistance than conventional products, reduces the value of the static/dynamic friction coefficient differential (AO of the coating film and makes it possible to improve stick-slip characteristics while also achieving a smooth film surface where the occurrence of pinholes on the film surface is inhibited.

Furthermore, even when it is necessary to avoid the use of an amide-based solvent such as N-methylpyrrolidone (NMP) as Component (D) due to human health and environmental concerns, by using a compound such as 1,3-dimethyl-2-imidazolidinone it is possible to provide an aqueous coating agent composition which exhibits superior workability and is stable and flows using a solvent which does not adversely affect the environment and human health, and in particular it is possible to design products which comply with European environmental regulations.

MODES FOR CARRYING OUT THE INVENTION

A first aspect of the present invention is an aqueous coating agent composition which includes:
(A) A curable resin in the form of an aqueous emulsion,
(B) A surfactant,
(C) Solid particles,
(D) One or more types of nitrogen-containing heterocyclic compounds,
(E) A film-forming silicone in the form of an aqueous emulsion, and
(F) Water.
Each component is described below.

[Component (A)]

Component (A) corresponds to a curable resin in the form of an aqueous emulsion and is the main component of the aqueous coating agent composition pertaining to the present invention, forming a coating film via curing, and functioning as a solid particle, etc., binder resin. In particular, the curable resin in the form of an aqueous emulsion corresponds to a curable resin composition in which a curable resin component is dispersed in water, corresponding to a continuous phase, which is synthesized via emulsion polymerization, soap-free emulsion polymerization, etc., with examples including polyacrylic resin, polyurethane resin, polyolefin resin, epoxy resin, silicone resin, or polyamideimide resin, modified products thereof, and mixtures thereof.

Typically, these curable resins in the form of an aqueous emulsion are prepared by emulsifying or dispersing a polymerizable curable resin monomer or prepolymer in water in the presence or absence of a surfactant, after which the monomer or prepolymer is subjected to emulsion polymerization in water by heating, etc. The curable resin obtained via emulsion polymerization is then emulsified via the action of a surfactant or made to undergo self-emulsification by introducing a hydrophilic group into the curable resin, etc., resulting in a state in which fine curable resin particles are emulsified and dispersed in water, which generally assumes a suspended or cloudy appearance.

Since such emulsified and dispersed resin particles take the form of an aqueous emulsion, they are generally easy to handle and can form a film simply by removing water via drying, etc., providing an advantage in terms of reduced environmental load compared with preparations which employ an organic solvent. On the other hand, resin particles obtained via emulsion polymerization exhibit high reactivity due to unreacted monomers or residual reactive functional groups, and mixing in other components, especially other surfactants, or mixing in hydrophilic/hydrophobic solid particles tends to easily result in damage to the particles' uniform emulsified state. More specifically, the resin emulsion will undergo thickening or gelling with a loss in uniformity caused by the occurrence of coarse particles over time as well as the progression of inter-resin particle polymerization.

These curable resins in the form of an aqueous emulsion can be synthesized via known methods, and should preferably correspond to a curable resin in the form of an aqueous emulsion obtained via emulsion polymerization in water carried out using a surfactant, particularly an ionic surfactant. Additionally, although the particle size of the curable resin particles in the emulsion is not limited in any particular way, particle size (median size) as determined via laser diffraction/scattering should preferably range from approximately 0.1 to 10 and the appearance may be that of a cloudy liquid or suspension.

The polyacrylic resin in the form of an aqueous emulsion exists in the form of an aqueous emulsion or suspension polymerization solution, and may correspond to either a homopolymer or copolymer, as long as it is obtained via the polymerization of one or more acrylic monomers. Additionally, the corresponding structure and type are not limited in any particular way. Examples of the aforementioned acrylic monomer include one or two or more alkyl (meth)acrylates (where the number of carbon atoms in the alkyl group preferably corresponds to 1 to 8, with 1 to 6 more preferable and 1 to 4 particularly preferable) such as methyl (meth) acrylate, ethyl (meth)acrylate, isopropyl (meth)acrylate, n-butyl (meth)acrylate, 2-ethylhexyl (meth)acrylate, octyl (meth)acrylate; lower alkoxy lower alkyl (meth)acrylates such as methoxymethyl (meth)acrylate, methoxyethyl (meth)acrylate, ethoxymethyl (meth)acrylate, ethoxyethyl (meth)acrylate, and methoxybutyl (meth)acrylate; hydroxy lower alkyl (meth)acrylates such as 2-hydroxyethyl (meth) acrylate and 3-hydroxypropyl (meth)acrylate; acrylamide and methacrylamide; (meth) acrylamides having an N-unsubstituted or substituted (particularly lower alkoxy-substituted) methylol group, such as N-methylolacrylamide, N-methylolmethacrylamide, N-butoxymethylacrylamide, and N-butoxymethylmethacrylamide; phosphonyloxy lower alkyl (meth)acrylates such as phosphonyloxymethyl (meth) acrylate, phosphonyloxyethyl (meth)acrylate, and phosphonyloxypropyl (meth)acrylate; acrylonitrile; acrylic acid, methacrylic acid, etc. Note that the aforementioned terms lower alkoxy and lower alkyl usually refer to alkoxy and alkyl groups having 1 to 5 carbon atoms, respectively, with 1 to 4 carbon atoms preferable and 1 to 3 carbon atoms more preferable.

Here, in order to further improve the adhesion of the polyacrylic resin to various substrates, it may include as a component that constitutes the hard segment of the cured product a (meth)acrylic acid compound of (meth)acrylic equivalent 100 or less, with 95 or less preferable and 90 or less more preferable, in addition to, as component that constitutes the soft segment of the cured product, a (meth) acrylic acid compound of (meth)acrylic equivalent 120 to 300, with 130 to 270 preferable and 150 to 250 more preferable, along with other curable resins (e.g., polyurethane resin, etc.). The use of such a mixture with a polyacrylic resin or other curable resin is consistent with that proposed by the applicant of International Patent Application No. PCT/JP14/061806.

Although the type of polyurethane resin used is not limited in any particular way, a polyurethane resin obtained by reacting at least one kind of polyol with at least one kind of isocyanate is preferable. Additionally, the polyurethane resin in the form of an aqueous emulsion may be rendered self-emulsifiable via the introduction of a hydrophilic group or it may correspond to a form obtained via emulsion and dispersion in water using anionic surfactants, particularly an anionic surfactant such as triethylamine carboxylate.

The polyol is not limited in any particular way as long as it has two or more hydroxyl groups per molecule, and a conventionally known polyol can be used. Viable examples include polyester polyol, polycarbonate polyol, polyether polyol, polycaprolactone polyol, polyalkylene polyol, etc. The polyol may be used alone or in a combination of two or more.

Examples of polyester polyols include polyester polyols obtained by subjecting a polyvalent carboxylic acid and a polyol to condensation polymerization. Examples of polycarboxylic acids include succinic acid, terephthalic acid, isophthalic acid, dodecandioic acid, 1,5-naphthalic acid, 2,6-naphthalic acid, succinic acid, glutaric acid, adipic acid, pimelic acid, suberic acid, azelaic acid, sebacic acid, dodecamethylene dicarboxylic acid and other dicarboxylic acids, etc. The use of a linear dicarboxylic acid as a polyvalent carboxylic acid is preferable. The number of carbon atoms borne by a linear dicarboxylic acid should preferably correspond to four or more, with a range of 4 to 12 preferable. Moreover, the number of carbon atoms in the linear dicarboxylic acid should preferably be even. Specific examples of such a linear dicarboxylic acid include succinic acid, adipic acid, suberic acid, sebacic acid and dodecane diacid. Additionally, examples of polyols include propylene glycol, 1,3-propanediol, 1,4-butanediol, neopentyl glycol, 1,5-pentanediol, 1,6-hexanediol, ethylene glycol, diethylene glycol, cyclohexanediol, etc. The polycarboxylic acid and polyol may be used alone or in a combination of two or more varieties. The hydroxyl value of the polyester polyol should preferably range from 2 to 160 mgKOH/g.

The polycarbonate polyol corresponds to a compound having a repeating unit represented by the formula: —RO(C=O)O— (where R represents a divalent aliphatic or alicyclic hydrocarbon group having 2 to 5 carbon atoms) as well as two or more hydroxyl groups, such as polyhexamethylene carbonate polyol and polycyclohexane dimethylene carbonate polyol.

The polycarbonate diol corresponds to a compound having the above repeating unit and two hydroxyl groups in each molecule. Polycarbonate diols can be synthesized from aliphatic and/or cycloaliphatic diols via various methods described in Schell, Polymer Review, Vol. 9, pp. 9-20 (1964). Examples of preferred diols include ethylene glycol, 1,2-propanediol, 1,3-propanediol, 1,2-butanediol, 1,3-butanediol, 1,4-butanediol, neopentyl glycol, 2,3-butanediol, 1,5-pentanediol, 1,6-hexanediol, 2,5-hexanediol, 1,4-cyclohexanediol, 1,4-cyclohexanedimethanol, etc.

The average molecular weight of the polycarbonate diol typically ranges from 500 to 5,000 in terms of number average molecular weight, with a range of 1,000 to 3,000 preferable, and it is desirable for substantially all of the polymer terminals to correspond to hydroxyl groups. In the present invention, other than the diols described above, a compound having three or more hydroxyl groups in one molecule, such as a polycarbonate polyfunctionalized using a small amount of trimethylolethane, trimethylolpropane, hexanetriol, pentaerythritol, etc. may be used.

Examples of polyether polyols include polyethylene glycol, polypropylene glycol, polytetramethylene glycol, random copolymers and block copolymers thereof, and modified polyoxyalkylenes of bisphenol A.

Examples of polycaprolactone polyols include polycaprolactone polyols obtained via ring-opening addition polymerization of a lactone compound to a polyol. Examples of polyols include polyester polyols similar to the polyols described above. Furthermore, examples of lactone compounds include β-propiolactone, pivalolactone, δ-valerolactone, ε-caprolactone, methyl-ε-caprolactone, dimethyl-ε-caprolactone, trimethyl-ε-caprolactone, etc.

Examples of polyalkylene polyols include polybutadiene polyol, hydrogenated polybutadiene polyol, hydrogenated polyisoprene polyol, etc.

As a polyol, a polyester polyol or polycarbonate polyol is preferable, while a polycarbonate polyol is more preferable and a polycarbonate diol is yet more preferable.

Isocyanates are also not limited in any particular way as they have an isocyanate group in each molecule, and a conventionally known isocyanate can be used. As an isocyanate, a polyisocyanate having two or more isocyanate groups in each molecule is preferable. An isocyanate may be used alone or in a combination of two or more.

Examples of polyisocyanates include 4,4'-diphenylmethane diisocyanate (4,4'-MDI), 2,4-diphenylmethane diisocyanate (2,4-MDI), 2,2'-diphenylmethane diisocyanate (2,2'-MDI), carbodiimide modified diphenylmethane diisocyanate, polymethylene polyphenyl polyisocyanate, carbodiimidated diphenylmethane polyisocyanate, tolylene diisoisocyanate (TDI, 2,4 form, 2,6 form or a mixture thereof), xylylene diisocyanate (XDI), 1,5-naphthalene diisocyanate (NDI), tetramethyl xylene diisocyanate, phenylene diisocyanate, hexamethylene diisocyanate (HDI), dimer acid diisocyanate, norbornene diisocyanate, lysine diisocyanate, xylylene diisocyanate, tetramethyl xylylene diisocyanate, isophorone diisocyanate (IPDI), hydrogenated diphenylmethane diisocyanate (hydrogenated MDI), hydrogenated xylylene diisocyanate (hydrogenated XDI), cyclohexane diisocyanate, dicyclohexylmethane diisocyanate, isophorone diisocyanate, etc.

As a polyisocyanate, diisocyanate or triisocyanate is preferable. Examples of a diisocyanate or triisocyanate include isophorone diisocyanate, tolylene diisocyanate, 4,4'-diphenylmethane diisocyanate, naphthylene diisocyanate, xylylene diisocyanate, phenylene diisocyanate, 3,3'-dichloro-4,4'-phenylmethane diisocyanate, toluene diisocyanate, hexamethylene diisocyanate, 4,4'-dicyclohexylmethane diisocyanate, hydrogenated xylylene diisocyanate, triphenylmethane triisocyanate, tetramethyl xylene diisocyanate, hydrogenated 4,4'-diphenylmethane diisocyanate, etc.

The polyurethane resin in the form of an aqueous emulsion constituted by the present invention should more preferably correspond to a polycarbonate urethane resin obtained by reacting a polycarbonate polyol with a diisocyanate.

Polyolefin resin, epoxy resin, and polyamideimide resin in the form of an aqueous emulsion can be produced by, for example, emulsifying by mechanical means the corresponding curable resin synthesized via a known method in the presence of a surfactant. Silicone resin in the form of an aqueous emulsion can be obtained by emulsifying and dispersing a silicone resin previously synthesized in the same manner as described above, or via the emulsion-polymerization of a silane monomer or low-molecular chain or a cyclic silicone oligomer in the presence of a surfactant.

Examples of polyolefin resins include olefin copolymers such as a polyethylene resin and polypropylene resin and in particular a copolymer of any of the above with another vinyl monomer may be used. Furthermore, from the standpoint of the storage stability of the aqueous emulsion, it is particularly preferable that the monomer sequence of the olefin copolymer be random (atactic).

Epoxy resins are not limited in any particular way, and one or more varieties may be selected from bisphenol-type epoxy resins, amine-type epoxy resins, phenol novolak-type epoxy resins, cresol novolak-type epoxy resins, resorcinol-type epoxy resins, phenol-aralkyl-type epoxy resins, naphthol-aralkyl-type epoxy resins, dicyclopentadiene-type epoxy resins, epoxy resins having a biphenyl skeleton, isocyanate modified epoxy resins, tetraphenylethane-type epoxy resins, triphenylmethane-type epoxy resins, fluorene-type epoxy resins, etc.

Polyamide resin is a synthetic resin having an amide bond and polyamide resins obtained via a condensation reaction between a polybasic acid having two or more carboxyl groups and a polyamine having two or more amino groups can generally be used. Examples of polybasic acids include succinic acid, glutaric acid, adipic acid, sebacic acid, phthalic acid, isophthalic acid, terephthalic acid, trimellitic acid, tetrahydrophthalic acid, endomethylenetetrahydrophthalic acid, hexahydrophthalic acid, etc. On the other hand, examples of polyamines include hydrazine, methylenediamine, ethylenediamine, propylenediamine, butylenediamine, hexanediamine, ethylaminoethylamine, methylaminopropylamine, iminobispropylamine, diethylenetriamine, triethylenetetramine, polyethyleneimine, diaminobenzene, triaminobenzene, diaminoethylbenzene, triaminoethylbenzene, diaminoethylbenzene, triaminoethylbenzene, polyaminonaphthalene, polyaminoethylnaphthalene, N-alkyl derivatives and N-acyl derivatives thereof, etc. For the polyamide resin, one variety may be used alone or a combination of two or more varieties may be used.

The polyamide imide resin is not limited in any particular way as long as it is a polymer having an amide bond and an imide bond within its molecular structure and can be prepared, for example, via the following methods by polymerizing a diisocyanate compound and a trivalent carboxylic acid derivative having an acid anhydride group in a solvent having a urea bond, for example. A polyamide-imide resin prepared via said synthesis method shall correspond to a solution obtained by dissolving the resin in a solvent, and one variety may be used alone or two or more varieties may be used in combination.

(1) Methods in which a diisocyanate compound and a trivalent carboxylic acid derivative having an acid anhydride group, and if present, all dicarboxylic acid compounds or diol compounds and tetravalent carboxylic acid derivatives having two acid anhydride groups are reacted together to obtain a polyamide-imide resin;

(2) Methods in which a dicarboxylic acid compound or a diol compound is reacted with an excess amount of isocyanate compound to synthesize an oligomer having an isocyanate group at its terminal, after which a trivalent carboxylic acid derivative having an acid anhydride group, and, if necessary, a tetravalent carboxylic acid derivative having two acid anhydride groups are added and reacted to obtain a polyamideimide resin;

(3) Methods in which a trivalent carboxylic acid derivative having an acid anhydride group and, if necessary, an excess amount of a tetravalent carboxylic acid derivative having two acid anhydride groups, are reacted with an isocyanate compound to synthesize an oligomer having a terminal acid or acid anhydride group, after which a dicarboxylic acid compound or a diol compound is added and a reaction is performed to obtain a polyamideimide resin.

Any silicone resin may be used without any particular restrictions, provided that it is an organopolysiloxane having a siloxane unit which functions as a binder resin via curing or solvent removal (drying and solidification) and resins having a functional organic modifying group on their side chain or main chain, such as acrylic modified silicone resin, may be used. Preferred silicone resins correspond to branched organopolysiloxanes which contain one or more siloxanes independently selected from $(R_3SiO_{0.5})$ siloxane units, $(R_2SiO)$ siloxane units, $(RSiO_{1.5})$ siloxane units or $(SiO_2)$ siloxane units (typically, M siloxane units, D siloxane units, T siloxane units and Q siloxane units, respectively) (where R may correspond to any organic group containing 1 to 30 carbon atoms, preferably an alkyl or aryl group having up to 8 carbon atoms, and more preferably a methyl group, ethyl group or phenyl group). In particular, silicone resins containing both a D siloxane unit and a T siloxane unit are preferable.

Examples of methods used for emulsification or dispersion for the purposes of obtaining a curable resin in the form of an aqueous emulsion include generally known emulsification methods. Examples of emulsification methods include high-pressure emulsification using mechanical forces, inverse emulsification, ultrasonic emulsification and solvent emulsification. Note that when the curable resin is not self-emulsifying, it is preferable that the curable resin be emulsified or dispersed in water using the same surfactant as, or a different surfactant than, the surfactants described below.

The curable resin in the form of an aqueous emulsion shall, in addition to curable resin and an optional surfactant component, also contain water as a dispersion medium, and when the curable resin in the form of an aqueous emulsion is used as a component of the aqueous coating agent composition, part or all of the resin shall be included in water corresponding to Component (F).

[Component (B)]

Component (B) corresponds to a surfactant and is the component responsible for uniformly dispersing the solid particles of Component (C) in the aqueous coating agent composition. Solid particles, particularly solid particles which correspond to a solid lubricant, generally show poor water dispersibility even if the surface is subjected to a hydrophilic treatment, and when Component (B) is not used, the solid particles corresponding to Component (C) separate or precipitate out from the aqueous coating agent composition and it becomes difficult to obtain a uniform aqueous coating agent composition.

On the other hand, as described above, surfactant and solid particles added to the system may impair the dispersion stability of the curable resin in the form of an aqueous emulsion. Component (B) used in the present invention may be the surfactant used for forming a curable resin in the form of an aqueous emulsion or it may correspond to a surfactant which is different than the surfactant used for forming a curable resin in the form of an aqueous emulsion. This is because even if a resin emulsion can be formed without using a surfactant, such as in the case of a self-emulsifying type polyurethane resin, by adding a surfactant to the system in order to disperse the solid particles, the surface of the curable resin interacts with the surfactant, potentially impairing dispersion. In the present invention, it is particularly preferable that the surfactant corresponding to Component (B) be a surfactant that differs from the surfactant used for forming the emulsion form of Component (A), and should preferably contain, specifically, an ionic surfactant, more specifically, an anionic surfactant.

For Component (B), the type of surfactant is not particularly limited in any way, and any nonionic surfactant, anionic surfactant, amphoteric surfactant or cationic surfactant may be used. Examples of nonionic surfactants include, polyoxyethylene alkyl esters constituted from, for example, polyoxyethylene alkyl ether, polyoxyalkylene (ethylene and/or propylene) alkyl phenyl ether or polyethylene glycol (or ethylene oxide) and a higher fatty acid (e.g., straight or branched fatty acids having 12 to 18 carbon atoms), as well as polyoxyethylene sorbitan alkyl esters constituted from sorbitan, polyethylene glycol and higher fatty acids (e.g., straight or branched fatty acids having 12 to 18 carbon atoms). Examples of anionic surfactants include fatty acid salts, sulphate ester salts, sulfonate salts, phosphate ester salts, dithiophosphate ester salts, etc. Examples of amphoteric surfactants include amino acid-type and betaine-type carboxylate salts, sulphate ester salts, sulfonate salts and phosphate ester salts. Examples of cationic surfactants include aliphatic amine salts and quaternary ammonium salts. One type of surfactant may be used alone, or two or more types of surfactant may be used in combination.

Specific examples of anionic surfactants include potassium oleate, sodium laurate, sodium dodecylbenzenesulfonate, sodium alkanesulfonate, sodium alkylnaphthalenesulfonate, sodium dialkylsulfosuccinate, sodium polyoxyethylene alkyl ether sulphate, sodium polyoxyethylene alkyl allyl ether sulphate, polyoxyethylene alkyl phosphate, polyoxyethylene alkyl allyl phosphate, etc.

Specific examples of cationic surfactants include surfactants such as stearylamine hydrochloride, lauryl trimethyl ammonium chloride, trimethyl octadecyl ammonium chloride, etc.

Specific examples of nonionic surfactants include surfactants such as polyoxyethylene alkyl ether, polyoxyethylene alkyl allyl ether, polyoxyethylene oxypropyl block polymer, polyethylene glycol fatty acid ester, polyoxyethylene sorbitan fatty acid ester, etc.

[Component (C)]

Component (C) corresponds to solid particles, and is the component that imparts the desired functionality to the aqueous coating agent constituted by the present invention. The type of solid particles is not particularly limited, and examples include solid lubricants; reinforcing fillers; thickeners; antiwear additives; pigments; coloring materials; ultraviolet absorbers; thermally conductive fillers; conductive fillers; and insulation materials or other functional particles. It should be noted that some particles can be blended as a plurality of functional particles.

When the aqueous coating agent constituted by the present invention is used as a coating composition for an aqueous lubricating film, at least part of Component (C) should preferably correspond to a solid lubricant. By including a solid lubricant, the composition constituted by the present invention can form a lubricating film on the surface of a substrate, and said lubricating film can maintain excellent sliding characteristics for a long period of time. Therefore, the composition constituted by the present invention can provide a lubricating coating having high adhesion and excellent sliding durability as a coating composition for a lubricating film.

The solid lubricant is not limited in any particular way, and one kind of solid lubricant may be used, or two or more kinds of solid lubricants may be used in combination. Specific examples include molybdenum disulphide, tungsten disulphide, calcium stearate, mica, graphite, polytetrafluoroethylene (PTFE), other lubricating resins, composite oxides having an oxygen-deficient perovskite structure ($Sr_xCa_{1-x}CuO_y$, etc.), etc. Additional examples include carbonates (alkali metal or alkaline earth metal carbonates such as $Na_2CO_3$, $CaCO_3$ and $MgCO_3$), silicates ($M_xO_ySiO_2$ [M: alkali metal or alkaline earth metal), etc.], metal oxides (oxides of typical metal elements, oxides of transition metal elements, composite oxides containing said metal elements [$Al_2O_3$/MgO, etc.], etc.), sulfides (PbS, etc.), fluorides ($CaF_2$, $BaF_2$, etc.), carbides (SiC, TiC), nitrides (TiN, BN, AlN, $Si_3N_4$, etc.), cluster diamond, and fine particles which can suppress direct contact between metals without dramatically lowering the friction coefficient and which can be expected to prevent fouling, such as fullerene $C_{60}$ or mixtures of $C_{60}$ and $C_{70}$. Examples of oxides of typical metal elements as stated above include $Al_2O_3$, CaO, ZnO, SnO, $SnO_2$, CdO, PbO, $Bi_2O_3$, $Li_2O$, $K_2O$, $Na_2O$, $B_2O_3$, $SiO_2$, MgO, $In_2O_3$, etc. Among these, those with typical metal elements corresponding to alkaline earth metals, aluminum and zinc are preferred. Examples of oxides of the aforementioned transition metal elements include $TiO_2$, NiO, $Cr_2O_3$, $MnO_2$, $Mn_3O_4$, $ZrO_2$, $Fe_2O_3$, $Fe_3O_4$, $Y_2O_3$, $CeO_2$, CuO, $MoO_3$, $Nd_2O_3$, $H_2O_3$, etc.

Preferable examples of solid lubricants include, for example, fine particles of an organic compound comprising fluororesin (particularly polytetrafluoroethylene, tetrafluoroethylene hexafluoropropylene copolymer, etc.), polyethylene resin, polyamide resin, etc., fine particles of an inorganic compound such as molybdenum disulphide, graphite, aluminum oxide, boron nitride, zinc oxide, etc., fine particles of a metal such as lead, and mixtures thereof. In particular, the use of at least one type of solid lubricant selected from a set comprising fluorine resin, polyethylene resin, polyamide resin, molybdenum disulphide, graphite, aluminum oxide, boron nitride, zinc oxide as well as mixtures thereof is preferable. Note that when resin particles are used as a solid lubricant, unlike Component (A), the resin particles need not be in the form of an emulsion.

The average particle size of the solid lubricant should preferably correspond to 15 μm or less, with a range of 0.2 to 10 μm more preferable. Here, average particle size means volume average particle size measured using particle size obtained from a laser diffraction type particle size distribution analyzer or a scanning electron microscope.

The reinforcing filler corresponds to a component intended to impart mechanical strength to the film obtained by curing the aqueous coating agent constituted by the present invention and to improve its performance as a protective agent or adhesive. Examples of such a reinforcing filler include inorganic fillers such as fumed silica fine powder, precipitated silica fine powder, calcined silica fine powder, fumed titanium dioxide fine powder, quartz fine powder, calcium carbonate fine powder, diatomaceous earth fine powder, aluminum oxide fine powder, aluminum hydroxide fine powder, zinc oxide fine powder, zinc carbonate fine powder, etc.; these inorganic fillers may also include inorganic fillers surface-treated with various treatment agents, including organoalkoxysilanes such as methyltrimethoxysilane, organohalosilanes such as trimethylchlorosilane, organosilazanes such as hexamethyldisilazane and siloxane oligomers such as α,ω-silanol group-blocked dimethylsiloxane oligomer, α,ω-silanol group-blocked methylphenylsiloxane oligomer, α,ω-silanol group-blocked methylvinylsiloxane oligomer, etc. In addition, part of the silica, etc., functions as a thickener or antiwear agent.

Examples of fine particles used as a heat conductive filler or electro-conductive filler include fine metal powders such as gold, silver, nickel and copper; fine powders obtained by vapour deposition or plating of a metal such as gold, silver, nickel, copper, etc. on the surface of fine particles such as ceramic, glass, quartz, organic resin, etc.; metal compounds such as aluminum oxide, aluminum nitride, zinc oxide, etc. and mixtures of two or more of the above. Particularly preferable are silver powder, aluminum powder, aluminum oxide powder, zinc oxide powder, aluminum nitride powder or graphite. When electrical insulation is required, a metal oxide-based powder or a metal nitride-based powder is preferable, and aluminum oxide powder, zinc oxide powder or aluminum nitride powder are particularly preferable.

Other viable examples of solid particles include colorants such as pigments [inorganic colorants (inorganic pigments)], which may be achromatic or chromatic (yellow, orange, red, purple, blue, green, etc.) Furthermore, solid particles having various functions such as ultraviolet absorption (or blocking) include metal oxides (or metal oxide particles) such as titanium oxide and zinc oxide. In particular, when imparting of coloration or ultraviolet coating functionality is desired, the coating layer constituted by the present invention should preferably include the above components.

Examples of other optional solid particles include metal hydroxides (aluminum hydroxide, etc.) and metal salts (sulphates; carbonates such as calcium carbonate; phosphates such as calcium phosphate and titanium phosphate; silicates such as mica, calcium silicate, bentonite, zeolite, maltstone, talc and montmorillonite; tungstates such as calcium tungstate; titanates such as barium titanate, potassium titanate, aluminum titanate and strontium titanate, etc.), metal nitrides (silicon nitride, boron nitride, aluminum nitride, titanium nitride, etc.), metal carbides (silicon carbide, boron carbide, titanium carbide, tungsten carbide, etc.), metal borides (titanium boride, zirconium boride, etc.), metals (gold, platinum, palladium, etc.), carbon (carbon black, graphite, fullerene, carbon nanotubes, etc.), silicone resin-based fillers, fluororesin-based fillers, polybutadiene resin-based fillers, etc. The solid particles may be in the form of fibers (e.g., glass fibers, carbon fibers, metal fibers, whiskers, etc.), but should preferably be in the form of particles. The solid particles may be ferromagnetic, with examples including ferromagnetic metals (powders) such as iron, cobalt, and nickel; ferromagnetic alloys (powders) such as magnetite and ferrite; and ferromagnetic metal oxides (powders) such as magnetic iron oxide, etc. Examples of silicone resin-based fillers include "TREFIL" manufactured by Dow Corning Toray Co., Ltd., "SPM" manufactured by Wacker Asahikasei Silicone Co., Ltd., etc.

The shape of the solid particles is not limited in any particular way, and particles of any conformation, including particulate, placoid, acicular, fibrous, etc. may be used. When the shape of the solid particles is anisotropic such as when they are placoid, acicular or fibrous, the corresponding aspect ratio may be 1.5 or greater, 5 or greater or 10 or greater.

[Component (D)]

Component (D) corresponds to one or more types of nitrogen-containing heterocyclic compounds which constitute characteristic components of the present invention, corresponds to a hydrophilic solvent that is miscible with (E) water and at the same time functions as a film-producing auxiliary agent of an aqueous coating agent composition.

When a surfactant is added to the system to stably disperse solid particles of a solid lubricant as specified above in an aqueous coating agent composition, the curable resin in the form of an emulsion interacts with the surfactant and as a result the surface state of the curable resin may be destabilized, causing thickening and gelling and significantly adversely affecting fluidity (i.e., coatability). On the other hand, if surfactant is not added, solid particles corresponding to a solid lubricant, etc. may form precipitates in the aqueous coating agent, impairing storage stability as well as making it impossible to uniformly apply the entire aqueous coating agent, thereby making it impossible to obtain a coating film having the desired functionality. However, by using Component (D) of the present invention, interaction with the surfactant within the system is reduced, and the (A) curable resin in the form of an aqueous emulsion and the (C) solid particles are stably dispersed in water, suppressing gelation and the formation of coarse particles. Furthermore, as described above, Component (D) corresponds to a film-producing auxiliary agent and makes it possible to provide a uniform and tough coating film upon curing. Additionally, Component (D) may be of one type, or when necessary, be used alone or as a mixture of two or more types.

Component (D) corresponds structurally a 4- to 20-membered heterocyclic compound containing one or more nitrogen atoms in the cyclic portion, and the carbon atoms adjacent to the nitrogen should preferably constitute part of a ketone group (C=O). Furthermore, a 4- to 13-membered, 4- to 8-membered or 4- to 6-membered heterocyclic compound containing one or two or more nitrogen atoms is preferable from the standpoint of affinity for (E) water and functionality as a film-producing auxiliary agent, with preferable examples including one or two or more nitrogen-containing 5-membered ring heterocyclic compounds such as pyrrolidone compounds, imidazolidinone compounds or oxazolidone compounds having a ketone group.

On the other hand, surprisingly, even if a heterocyclic compound containing no nitrogen (N) in the cyclic portion, such as, for example, a lactone-based compound, is used, the technical effect of the present invention cannot be achieved. Similarly, the use of a ketone solvent that does not qualify as a nitrogen-containing heterocyclic compound (e.g., acetone and methyl ethyl ketone) does not achieve the technical effect of the present invention but rather may significantly adversely affect the stability of the aqueous coating agent composition due to emulsion breakdown, etc. Therefore, selection of a nitrogen-containing heterocyclic compound is absolutely essential for realizing the specific and significant technical effect of the present invention, and it is difficult to predict the technical effect produced by compounds having a similar structure.

Specific examples of the nitrogen-containing heterocyclic compound which corresponds to Component (D) include heterocyclic compounds containing two nitrogen atoms represented by the Structural Formula (D-1) below as well as heterocyclic compounds containing one nitrogen atom represented by the Structural Formula (D-2) below.

[Chemical Formula 2]

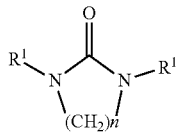
(D-1)

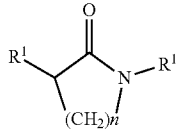
(D-2)

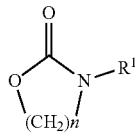
(D-3)

In the above formula, $R^1$ corresponds to a hydrogen atom or alkyl groups each independently having 1 to 9 carbon atoms; with examples including a hydrogen atom and linear, branched or cyclic alkyl groups such as a methyl group, an ethyl group, a hexyl group or a cyclohexyl group. Note that some of the hydrogen atoms of the alkyl group may be substituted with halogen atoms. n corresponds to a number ranging from 1 to 10, and n should preferably correspond to a number ranging from 1 to 5, with an n of 2 or 3, i.e., a 5- or 6-membered ring structure, most preferable.

In the context of the present invention, particularly preferable forms of Component (D) correspond to at least one type of nitrogen-containing heterocyclic compound selected from 1,3-dimethyl-2-imidazolidinone, N-methyl-2-pyrrolidone, N-ethyl-2-pyrrolidone, N-methyl-3-methyl-2-pyrrolidone, cyclohexylpyrrolidone, 2-oxazolidone, and 3-methyl-2-oxazolidone. Among nitrogen-containing heterocyclic compounds having a five-membered ring structure, a pyrrolidone compound or an imidazolidinone compound represented by Formula (D-1) or Formula (D-2) above with n=2 is particularly preferable. Specific examples include 1,3-dimethyl-2-imidazolidinone, N-methyl-2-pyrrolidone and N-ethyl-2-pyrrolidone, with 1,3-dimethyl-2-imidazolidinone particularly preferable.

Furthermore, a compound represented by the following structural formula containing 1,3-dimethyl-2-imidazolidinone may be selected as Component (D) from the standpoint of environmental regulations. The corresponding reason is described below.

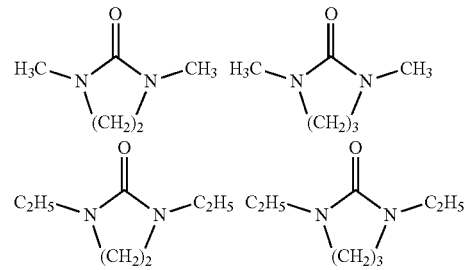

From the standpoint of a film-forming auxiliary agent, amide solvents such as N-methylpyrrolidone (NMP), N,N-dimethylacetamide and N,N-dimethylformamide plasticize aqueous emulsion resins very well, and are excellent solvents in terms of handling and workability due to their high boiling point and a low freezing point. However, it has been reported in Europe that the above amide solvents exhibit reproductive toxicity and it is necessary to pay attention to the handling of amide solvents, including the handling of residual solvents in coating films and structures, primarily in Europe. In particular, there is a movement to avoid the use of amide solvents in Europe and there have been cases in which the use of an amide solvent such as N-methylpyrrolidone (NMP) was not allowed due to concerns for the environment and human health.

On the other hand, by using a compound such as the aforementioned 1,3-dimethyl-2-imidazolidinone, etc. it is possible to provide an aqueous coating agent composition which stably flows and exhibits superior handling and workability using solvents that do not adversely impact the environment or human health. From the standpoint of environmental regulatory compliance, the most preferable form of Component (D) is 1,3-dimethyl-2-imidazolidinone.

[Component (E)]

Component (E) is a film-forming silicone in the form of an aqueous emulsion and a characteristic component of the present invention; it has a rubber-like elasticity due to the removal of moisture and is capable of forming a cured film which exhibits substantial adhesion to a substrate. Such a film-forming silicone is characterized in that it is obtained via emulsification of a silicone compound having a reactive functional group involved in a silicone rubber film-forming reaction within its molecular structure in the presence of colloidal silica which constitutes reinforcing particles of a rubber film, etc. Here, a high molecular weight organopolysiloxane having no reactive functional group (for example, silicone gum, etc.), is not preferable as the resulting coating film can become partially water-repellent and may provide an uneven film. In addition, since silicone elastomer particles, etc. that have been cured in advance do not uniformly mix into the entire coating in the same manner as the solid particles described above, the smoothness of the coating film thus obtained cannot be improved. Furthermore, even if silicone gum or silicone elastomer particles are incorporated for the purpose of improving the elasticity of the coating film, it is difficult to achieve the technical effects exhibited by the present invention, including improving stick-slip characteristics by reducing the value of the static/dynamic friction coefficient differential (AO.

This component (E) should preferably correspond to a film-forming silicone in the form of an aqueous emulsion comprising 100 parts per mass of (Ea) a polyorganosiloxane having at least two hydroxyl groups or hydrolyzable groups bonded to a silicon atom per molecule, 0.1 to 200 parts per mass of (Eb) colloidal silica, 1 to 100 parts per mass of (Ec) ionic surfactant, 0 to 50 parts per mass of (Ed) nonionic surfactant and 10 to 5,200 parts per mass of (Ef) water, and furthermore, it may also include 0.1 to 100 parts per mass of (Eg) an aminoxy group-containing organosilicon compound having an aminoxy group bonded to a silicon atom, 0.1 to 50 parts per mass of (Eh) an alkoxysilane or alkoxyalkoxysilane represented by the formula $R_aSiX_{4-a}$ (where R corresponds to an unsubstituted monovalent hydrocarbon group or a substituted monovalent hydrocarbon group, X corresponds to an alkoxy group or an alkoxyalkoxy group, and a corresponds to 0, 1, or 2) or 0.1-50 parts per mass of a partially hydrolyzed condensate of the aforementioned alkoxysilane or alkoxyalkoxysilane, as well as (Ei) an amine (pH adjuster).

Component (Ea) corresponds to a polyorganosiloxane having at least two hydroxyl groups or hydrolyzable groups bonded to a silicon atom per molecule, and constitutes the main component of Component (E). The molecular structure of the polyorganosiloxane may be linear, cyclic, branched, dendritic, or network-like, with a linear or partially branched linear structure preferable. A hydroxyl group or the hydrolyzable group may be present at the terminal of the molecular chain, may be present on a side chain of the molecular chain, or may be present on both. In particular, for Component (Ea), Component (Ea-1) is preferably a polyorganosiloxane having at least two groups per molecule, where each group is selected from a set comprising a hydroxyl group, an alkoxy group and an alkoxyalkoxy group bonded to a silicon atom, with examples including alkoxy groups having 1 to 10 carbon atoms, such as a methoxy group; alkoxyalkoxy groups having 2 to 10 carbon atoms, such as a methoxymethoxy group, etc. Furthermore, silicon atom-bound functional groups which do not correspond to a hydroxyl or hydrolyzable group contained within said polyorganosiloxane should preferably correspond to an unsubstituted or substituted monovalent hydrocarbon group, and should preferably be an alkyl group having 1 to 10 carbon atoms, an aryl group having 6 to 10 carbon atoms or an alkenyl group having 2 to 10 carbon atoms, where a portion of the hydrogen atoms may be substituted with a fluorine atom, etc., with methyl and phenyl groups particularly preferable.

Component (Ea) should preferably correspond to a diorganopolysiloxane that is hydroxyl-blocked at both ends of the molecular chain. Examples of such a diorganopolysiloxane that is hydroxyl-blocked at both ends of the molecular chain include polyorganosiloxanes represented by the general formula: HO(R2SiO)mH. In the above formula, R is the same as the non-hydroxyl, non-hydrolyzable unsubstituted or substituted monovalent hydrocarbon group bonded to a silicon atom specified above, and should preferably correspond to a methyl group or a phenyl group. m corresponds to an integer equal to or greater than 2, and should preferably correspond to a number such that viscosity at 25° C. is within a range of 50 mPa·s to 2,000,000 mPa·s. Note that the above component (Ea) may be obtained by any production method, and may correspond to a polyorganosiloxane synthesized in an aqueous phase via an emulsion polymerization reaction.

Colloidal silica, corresponding to Component (Eb), is a component that serves to improve the strength and substrate adhesion of the cured film. Colloidal silica is available as an aqueous dispersion in which 5 to 40% per mass silica particles are colloidally dispersed in water, has many silanol groups on its surface and generally has a particle size of about 1 nm to 1 μm. Such colloidal silica should preferably correspond to a basic aqueous dispersion stabilized by ions of an alkali metal such as sodium ions or potassium ions; ammonium ions; amines, etc. Among the above, a basic aqueous dispersion stabilized by sodium ions or ammonium ions is preferable. The pH of the colloidal silica in the form of a basic aqueous dispersion should preferably be 7.0 or greater with 9.0 or greater more preferable. The shape of silica fine particles contained in the colloidal silica is not limited in any particular way and though such particles are generally spherical, particles of an elongated or pearl necklace-like conformation may also be used.

Specific examples of such a colloidal silica include SNOWTEX 20, SNOWTEX 30, SNOWTEX 40, SNOWTEX 50, SNOWTEX N, SNOWTEX S, SNOWTEX XS, SNOWTEX 20L, SNOWTEX ST-XS, SNOWTEX ST-SS, SNOWTEX ZL, SNOWTEX UP, SNOWTEX PS-S and SNOWTEX PS-M manufactured by Nissan Chemical Industries, Ltd.; ADELITE AT-20, ADELITE AT-30, ADELITE AT-20N, ADELITE AT-30N, ADELITE AT-20A, ADELITE AT-30A, ADELITE AT-40, ADELITE AT-50, ADELITE AT-300 and ADELITE AT-300S manufactured by Asahi Denka Kogyo Co., Ltd.; Klebosol 30R9, Klebosol 30R50 and Klebosol 50R50 manufactured by Clariant Japan Co., Ltd.; LUDOX® HS-40, LUDOX HS-30, LUDOX LS and LUDOX SM-30 manufactured by DuPont; Cataloid S-20L, Cataloid S-20H, Cataloid S-30L, Cataloid S-30H, Cataloid SI-30, Cataloid SI-40, Cataloid SI-50, Cataloid SI-350, Cataloid SI-500, Cataloid SI-45P, Cataloid SI-80P, Cataroid SA and Cataloid SC-30 manufactured by Shokubai Kasei Kogyo Co., Ltd.; and Silicadol-20, Silicadol-30, Silicadol-40, Silicadol-30S, Silicadol-20AL, Silicadol-20A, Silicadol-20B, Silicadol-20G and Silicadol-20GA manufactured by Nippon Chemical Industry Co., Ltd.

The ionic surfactant (Ec) serves as the primary surfactant in the aforementioned film-forming silicone in the form of an aqueous emulsion, and an anionic surfactant, cationic surfactant or amphoteric surfactant may be used. One kind of such a surfactant may be used alone, or two or more varieties of surfactant may be used in combination. Note that specific examples thereof are the same as the examples given for Component (B). Note that the aforementioned film-forming silicone in the form of an aqueous emulsion may be emulsified using one or two or more kinds of ionic surfactants, and may further contain a nonionic surfactant as described below.

The nonionic surfactant (Ed) corresponds to an optional component of the aforementioned film-forming silicone in the form of an aqueous emulsion, and may be included at 0 to 50 parts per mass per 100 parts per mass of the polyorganosiloxane corresponding to Component (Ea) described above; in the event that Component (E) is emulsified using not only Component (Ec) but also Component (Ed), the nonionic surfactant may be included within a range of 0.1 to 50 parts per mass. Specific examples thereof are the same as those given for Component (B) above, but when Component (E) contains a nonionic surfactant, it is particularly preferable for it to correspond to a polyoxyethylene-polyoxypropylene copolymer-type nonionic surfactant (Ed-1). Polyoxyethylene-polyoxypropylene copolymer-type nonionic emulsifier generally corresponds to a compound represented by the General Formula (1) or General Formula (2) below.

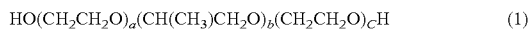

$$HO(CH_2CH_2O)_a(CH(CH_3)CH_2O)_b(CH_2CH_2O)_cH \quad (1)$$

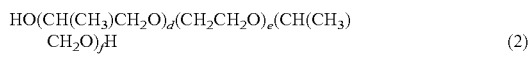

$$HO(CH(CH_3)CH_2O)_d(CH_2CH_2O)_e(CH(CH_3)CH_2O)_fH \quad (2)$$

In General Formulas (1) and (2), a, b, c, d, e and f correspond to mean molar additive amounts of ethylene oxide or propylene oxide, with each being a number between 1 and 350. The weight average molecular weight of Component (Ed-1) should preferably range from 1,000 to 18,000, with a range of 1,500 to 10,000 more preferable. When Component (Ed-1) is a solid, it can be used as an aqueous solution. By using such a polyoxyethylene-polyoxypropylene copolymer-type nonionic surfactant, colloidal silica, corresponding to Component (Eb), can be stably retained in the system in the form of an aqueous emulsion.

Specific examples of such a polyoxyethylene-polyoxypropylene copolymer-type nonionic emulsifier include the "Pluronic® L" series, "Pluronic® P" series, "Pluronic® F" series and "Pluronic® TR" series manufactured by ADEKA Corporation; EMULGEN® PP-290 manufactured by Kao Corporation; and Newcol® 3240 manufactured by Nippon Nyukazai Co., Ltd.

Component (Ef) corresponds to water and is a dispersion medium for the film-forming silicone. Water should preferably contain no components which inhibit emulsification and the storage stability of the emulsion, with examples including ion-exchanged water, distilled water, well water and tap water.

The film-forming silicone in the form of an aqueous emulsion pertaining to the present invention should preferably include Components (Ea) through (Ef) described above, and the optional inclusion of an aminoxy group-containing organosilicon compound having an aminoxy group bonded to a silicon atom (Eg) is preferable. Component (Eg) corresponds to a film-formation promoter and promotes the formation of a cured film exhibiting good surface hardness and rubber-like elasticity without stickiness when film-formation is induced with Component (E) alone, by inducing the reaction and cross-linking of Component (Ea) with itself or Component (Ea) and Component (Eb). Thus, when Component (E) of the present invention contains the aforementioned Component (Eg), the problem of the present invention can be more suitably solved.

Component (Eg) contains aminoxy groups bonded to two silicon atoms on average per molecule, and on average two aminoxy groups may be present only on side chains of the molecular chain or both ends of the molecular chain or may be present on average in one instance each on both a terminal end of the molecular chain terminal and a side chain of the molecular chain. When the number of aminoxy groups in Component (Eg) is three of greater per molecule on average, gelification of the mixture both during the mixing process prior to emulsification as well as within the emulsification apparatus during emulsion performed for the purposes of preparing Component (E) occurs readily, potentially causing the adhesion of gel to the production apparatus as well as poor elongation of cured film obtained from Component (E) alone, and is not preferable in the context of the context of the present invention. Note that, in the emulsion, it is possible, and furthermore preferable, for the aminoxy group-containing organosilicon compound corresponding to Component (Eg) to exist in the emulsion in a form obtained after it has reacted with a polyorganosiloxane having at least two hydroxyl groups or hydrolyzable groups bonded to a silicon atom per molecule corresponding to Component (Ea). These aminoxy groups are reactive with the terminal hydroxyl groups of Component (Ea), etc. and may be of a form in which they are reacted with the siloxane terminals in the emulsion.

Examples of such aminoxy group-containing organosilicon compound, include the aminoxy group-containing organosilicon compounds represented by formulas below. Note that, in the formulas, Me represents a methyl group, Et represents an ethyl group, and Pr represents a propyl group.
$(Et_2NO)Me_2SiOSiMe_2(ONEt_2)$
$(Et_2NO)Me_2SiO(Me_2SiO)_{12}SiMe_2(ONEt_2)$
$(Et_2NO)Me_2SiO(Me_2SiO)_{40}SiMe_2(ONEt_2)$
$(Et_2NO)Me_2SiO(Me_2SiO)_{80}SiMe_2(ONEt_2)$
$MeSi(ONEt_2)_2$
$Me_3SiO(MeSi(ONEt_2)O)_2SiMe_3$
$Me_3SiO(Me_2SiO)_4(MeSi(ONEt_2)O)_2SiMe_3$
$Me_3SiO(Me_2SiO)_{15}(MeSi(ONEt_2)O)_2SiMe_3$
$Me_3SiO(Me_2SiO)_3(MeSi(ONEt_2)O)_7SiMe_3$ From the standpoint of improving the strength and adhesion of cured film obtained from Component (E) alone, the film-forming silicone in the form of an aqueous emulsion pertaining to the present invention may furthermore include (Eh) an alkoxysilane or alkoxyalkoxysilane, or a partially hydrolyzed condensate of said alkoxysilane or alkoxyalkoxysilane, as expressed by the formula $R_aSiX_{4-a}$ (where R corresponds to an unsubstituted monovalent hydrocarbon group or a substituted monovalent hydrocarbon group, X corresponds to an alkoxy group or an alkoxyalkoxy group, and a corresponds to 0, 1 or 2), and said configuration is preferable in the context of the present invention.

Preferable forms of Component (Eh) include methyltriethoxysilane, 3-methacryloxypropylmethyldimethoxysilane, vinyltrimethoxysilane, 3-glycidoxypropyltrimethoxysilane, 3-mercaptopropyltriethoxysilane, tetraethoxysilane and partially hydrolyzed condensates thereof.

The film-forming silicone in the form of an aqueous emulsion pertaining to the present invention should furthermore preferably include an amine compound (Ei) as a pH adjuster. Examples of the amine compounds include diethylamine, ethylenediamine, butylamine, hexylamine, morpholine, monoethanolamine, triethylamine, triethanolamine, dipropanolamine, and 2-amino-2-methyl-2-propanol, among which diethylamine is preferable. The amount of Component (Ei) added as a pH adjuster should preferably range from 0.01 to 5% by mass, with a range of 0.1 to 2% by mass more preferable, allowing each component of Component (E) above to be stably maintained in the form of an aqueous emulsion.

Optional additives may be added to the film-forming silicone in the form of an aqueous emulsion pertaining to the present invention, provided that they do not impair the technical effect of the present invention. That is, thickeners, defoamers, penetrants, antistatic agents, inorganic powders, preservatives, silane coupling agents, pH adjusters, buffers, ultraviolet absorbers, curing catalysts, water-soluble resins, organic resin emulsions, pigments, dyes, etc. can be incorporated as appropriate. Note that, as described in Patent Document 7, by using Component (Eg) above, Component (E) of the present invention can be rendered essentially tin-free. Furthermore, as described in Patent Document 6, Component (E) of the present invention can limit the content of volatile siloxane oligomers (such as octamethyltetracyclosiloxane and decamethylpentacyclosiloxane).

For the film-forming silicone in the form of an aqueous emulsion pertaining to the present invention, the average particle diameter of the emulsion particles should preferably not exceed 500 nm, with 300 nm or smaller more preferable, from the standpoint of stability when aqueous dilution is performed. The average particle size of the emulsion particles can be measured via dynamic light scattering, etc.

The film-forming silicone in the form of an aqueous emulsion pertaining to the present invention can be prepared via known emulsion methods, and emulsion can be performed via, for example, the methods described in Patent Document 6 or Patent Document 7.

[Component (F)]

Component (F) is water, corresponding to the dispersion medium for the aqueous coating agent composition constituted by the present invention. Water may be incorporated into the system as a dispersion medium for the curable resin in the form of an aqueous emulsion constituted by Component (A) above as well as the film-forming silicone in the form of an aqueous emulsion constituted by Component (E) and may also be incorporated into the system as part of the aqueous solution of surfactant constituted by Component (B). Additionally, in addition to Component (D) described above, water may be pre-mixed with other optional water-soluble components as described below or other hydrophilic solvents such as alcohols, etc. Note that examples of the above are the same as those given for Component (Ef).

[Composition of the Aqueous Coating Agent]

The aqueous coating agent constituted by the present invention contains Components (A) through (E) specified above and should may suitably contain the following amounts of each component per 100 parts per mass of the solid component of Component (A) specified above:

Component (B): 0.1 to 50 parts per mass, 0.5 to 50 parts per mass or 1 to 50 parts per mass, with 2 to 40 parts per mass preferable and 5 to 35 parts per mass more preferable.

Component (C): 5 to 200 parts per mass, with 20 to 180 parts per mass preferable and 40 to 150 parts per mass more preferable.

Component (D): 1 to 20 parts per mass, with 2 to 15 parts per mass preferable and 5 to 10 parts per mass more preferable.

Component (E): 1 to 10 parts per mass in terms of solid content, with 2 to 6 parts per mass preferable and 2.5 to 5 parts per mass more preferable. If the amount of Component (E) included is less than the lower limit specified above, technical effects such as a reduction in the static/dynamic friction coefficient differential ($\Delta\mu$) of the coating film, inhibiting the occurrence of pinholes, etc. may not be sufficiently realized. On the other hand, if the amount of Component (E) exceeds the upper limit specified above, the coating film may excessively exhibit rubber-like properties, and the wear resistance of the coating film may be reduced.

Component (F): 50 to 1,000 parts per mass, with 100 to 800 parts per mass preferable and 300 to 600 parts per mass more preferable.

Note that, here, the "solid content of Component (A)" corresponds to the non-volatile component obtained by removing water or other volatile components from Component (A) via drying or heating, and is mainly comprised of curable resin base material or the non-volatile curable resin itself. Similarly, the "solid content of Component (E)" corresponds to the non-volatile component obtained by removing water or other volatile components from Component (E) via drying or heating, and primarily corresponds to polyorganosiloxane which forms a film when cured, associated cross-linking components, colloidal silica and surfactant; and it is virtually the same as the amount of solid component observed when Component (E) is individually induced to form a film, excluding any water, etc. which is generated due to the condensation reaction which occurs during film-formation, etc.

[Other Optional Water-Soluble Components]

The aqueous coating agent composition constituted by the present invention may also include lame agents, pearling agents, preservatives, fragrances, plasticizers, defoamers, fillers, antioxidants, ultraviolet absorbers, curing agents, catalysts, solvents, water-soluble polymers, flame retardants, antistatic agents and heat stabilizers as well as other additives which are added for the purposes of adjusting pH, preventing freezing, moisturization, labelling, promotion of drying, etc.

For example, the composition constituted by the present invention can contain a film-forming auxiliary agent other than Component (D). Examples of such a film-forming auxiliary agent include epoxy resin and epoxy silane. An epoxy resin used as a film-forming auxiliary agent can be used, for example, within a range of 0.1 to 10% by mass (wt) based on the total mass (wt) of the composition constituted by the present invention. An epoxy silane used as a film-forming auxiliary agent can be used, for example, within a range of 0.1 to 5% by mass (wt) based on the total mass (wt) of the composition constituted by the present invention.

The composition of the present invention can include at least one type of alcohol-based solvent. In the present invention, a single alcohol-based solvent may be used, or multiple alcohol-based solvents may be used in combination. From the standpoint of workability, the solvent should preferably be water or a mixed solvent of lower alcohol and water, with examples of lower alcohols including methanol, ethanol, and propanol.

The composition constituted by the present invention can include at least one type of silicone gum. In the present invention, a single type of silicone gum may be used, or multiple types of silicone gum may be used in combination. By incorporating silicone gum, the temperature dependence of the viscosity of the composition constituted by the present invention can be reduced. As a silicone gum, a conventionally known silicone gum can be suitably used, and it may be used, for example, at in an amount ranging from 0.001 to 3% by mass (by weight), based on the total mass (wt) of the composition constituted by the present invention.

The composition constituted by the present invention can include at least one type of anti-foaming agent. In the present invention, a single type of anti-foaming agent may be used, or multiple types of anti-foaming agent may be used in combination. By adding an antifoaming agent, foaming which occurs during application of the composition constituted by the present invention can be suppressed, making it possible to better facilitate the application process. As an anti-foaming agent, a conventionally known silicone gum can be suitably used, and it may be used, for example, at in an amount ranging from 0.00001 to 1% by mass (by weight), based on the total mass (wt) of the composition constituted by the present invention.

The composition constituted by the present invention can include at least one type of thickener. In the present invention, a single type of thickener may be used, or multiple types of thickeners may be used in combination. By adding a thickener, the viscosity of the composition can be increased, reducing dripping during application and making it possible to better facilitate the application process. As a thickener, a conventionally known silicone gum can be suitably used, and it may be used, for example, at in an amount ranging from 0.001 to 1% by mass (by weight), based on the total mass (wt) of the composition constituted by the present invention.

[Method for Preparing Composition]]

The method used to prepare the composition constituted by the present invention is limited in any particular way and the composition can be obtained via uniform mixing/dispersion of the aforementioned Components (A) through (E) as well as other optional soluble components using mechanical force, and were necessary preparation can be carried out by mixing/dispersing in water to adjust the concentration or other optional additives. There are no restrictions on the mixing method and the mixing order.

On the other hand, it is preferable to prepare (A) liquid emulsion containing a curable resin in the form of an aqueous emulsion via emulsion polymerization methods, etc. which employ an ionic or nonionic surfactant, after which Component (D), corresponding to one or more types of nitrogen-containing heterocyclic compounds is added to said liquid emulsion corresponding to Component (A) plasticizing or stabilizing the curable resin in the form of an aqueous emulsion. In this state, by engaging in production by uniformly mixing/dispersing other surfactants, (C) solid particles (preferably, a solid lubricant), the film-forming silicone in the form of an aqueous emulsion corresponding to Component (E), and water using mechanical force, thickening and gelling of the aqueous coating agent constituted by the present invention can be suppressed, achieving superior handling and workability. In particular, in a preferable embodiment of the present invention, the surfactant contains an anionic surfactant different from the surfactant used for forming the emulsion corresponding to the aforementioned Component (A) and furthermore the aforementioned Component (D) corresponds to a nitrogen-containing heterocyclic compound selected from a set comprising 1,3-dimethyl-2-imidazolidinone, N-methyl-2-pyrrolidone and N-ethyl-2-pyrrolidone.

Examples of the mixing and dispersing devices include propeller type, paddle type and anchor type mixers, homomixers, homodispers, homogenizers, high-pressure homogenizers, ultra-high-pressure homogenizers, ultrasonic homogenizers, vibrating mills, ball mills, planetary ball mills, sand mills, vacuum emulsifiers and paint shakers, but such devices are not limited to the above.

[Coating Composition for an Aqueous Lubricating Film]

When at least a part of the solid particles corresponding to Component (C) contains a solid lubricant, the aqueous coating agent composition constituted by the present invention can form a lubricating film on the surface of a substrate, and can be used as a coating for a water-based lubricating film. The coating for an aqueous lubricating film pertaining to the present invention exhibits superior handling and workability as an aqueous coating/coating agent, and furthermore said lubricating film maintains excellent sliding characteristics for a long period of time. Therefore, the composition constituted by the present invention can provide a lubricating coating having high adhesion as a coating composition for a lubricating film.

[Substrates]

The aqueous coating agent composition constituted by the present invention—preferably, a coating composition for an aqueous lubricating film—can be used to form a coating film—preferably, a lubricating film—by curing it by drying at room temperature, heated drying or high-energy ray irradiation and can form a coating film or lubricating film which exhibits a high level of adhesion to the surface of an arbitrary substrate.

The material of the substrate is not limited in any particular way and examples include metals such as iron, aluminum, and copper, rubber, resin, paper, wood, glass, cement, asphalt, leather, etc. When necessary, the surface of the substrate may be subjected to electrolytic etching, chemical etching, surface roughening via shot blasting, etc., chemical treatment using phosphate, etc. in order to improve adhesiveness.

In the present invention, the previously described aqueous coating agent composition—preferably, a coating composition for an aqueous lubricating film—can be applied to a substrate surface, after which said composition is subject to heating or said composition is subject to irradiation with high energy rays, thereby forming a film on the surface of said substrate.

Methods used to apply said composition to the surface of a substrate are not limited in any particular way, and, for example, conventionally known application methods such as screen printing, spraying, knife coating, tumbling, immersion, brush application, etc. may be used. In particular, when the composition constituted by the present invention is used as a coating composition for an aqueous lubricating film, it is preferable that the coating be left standing for a certain period of time to perform levelling. The lubricity of the coating obtained can be improved via levelling. Note that the substrate may be preheated at the time of application, but application should preferably be performed at room temperature (about 25° C.) from the standpoint of workability. Furthermore, in order to remove a solvent such as water from the composition constituted by the present invention, it is preferable to, for example, leave the composition to stand at room temperature for 1 to 240 minutes or to heat it at 40 to 80° C. for 1 minute to 60 minutes.

Next, after the solvent is removed, if the curable resin in the aforementioned composition is thermosetting, said composition film applied to the surface of the substrate is heated to obtain a cured film. The mode of heating can be appropriately adjusted, and, for example, heating can be performed at 170 to 200° C. for 5 to 90 minutes. If necessary, the removal of the aforementioned solvent and heating used to cure the resin may be performed simultaneously.

When the curable resin in the aforementioned composition curable via high-energy radiation, high-energy rays such as ultraviolet rays, X-rays, an electron beam, etc., are used to irradiate the composition applied to the substrate surface to obtain a cured film. Ultraviolet rays are preferred as high energy rays from the standpoint of safety, etc. Although the amount of ultraviolet irradiation used when ultraviolet rays are used as a source of high energy rays may be adjusted as appropriate, a cumulative amount of 1000 to 4000 mJ/cm² is preferable while 2000 to 3000 mJ/cm² is more preferable.

The present invention also relates to coating films thus obtained—in particular, lubricating coatings. The thickness of a coating constituted by the present invention is arbitrary, but may, for example, range from 1 to 50 with a range of 2 to 25 μm preferable and a range of 3 to 15 μm more preferable.

The lubricating coating constituted by the present invention is characterized in that it exhibits particularly excellent stick-slip characteristics due to the fact that the difference between the static friction coefficient at the start of sliding and the dynamic friction coefficient during sliding is small. Specifically, when the sliding partner is a metal, the value of the difference between the dynamic friction coefficient and the static friction coefficient, represented by Δμ, can be set to 0.05 or less, and the lubricating film can be designed such that it has a static friction coefficient of 0.15 to 0.20 and a dynamic friction coefficient of 0.10 to 0.15, and furthermore there exists the advantage that the film's dynamic friction coefficient is stably maintained even if the number of slides is repeated.

The lubricating coating constituted by the present invention has the advantage that, by incorporating Component (E), surface smoothness is improved and almost no pinholes occur.

[Members]

A member provided with a coating film pertaining to the present invention, particularly a lubricating film, is useful as a sliding member. The type of the sliding member is not limited in any particular way, and corresponding examples include members made from rubber, plastic, or metal.

Examples of the aforementioned rubber sliding members include timing belts, conveyor belts, body seals for sunroofs, glass runs, weather strips, oil seals, packing, wiper blades, doctor blades, and other drive members, sliding members, conveyor units, etc. used in automobiles, etc.

Examples of the aforementioned plastic sliding members include door panels, instrument panels, door locks, bearings, gears, belt tensioners, pressure belts, and other drive members, sliding members, conveyor members, etc. used in automobiles, etc.

Examples of the aforementioned metal sliding members include crankshafts, compressor shafts, slide bearings, gears, oil pump gears, pistons, piston rings, piston pins, gaskets, door locks, guide rails, seat belt buckles, brake pads, brake pad clips, brake shims, brake insulators, hinges, screws, pressure pads, and other drive members, sliding members, conveyor members, etc. used in automobiles, etc.

The sliding member configuration is not particularly limited, and may be, for example, fibrous or fiber-containing. Examples of fibrous or fiber-containing sliding members include vehicle seats, carpet, tire cords, and seat belts.

INDUSTRIAL APPLICABILITY

Applications for the aqueous coating agent composition constituted by the present invention include, for example, household appliances, ships, railways, aircraft, machinery, structures, automobile repairs, automobiles, construction, building materials, fibers, leather, stationery, woodworking, furniture, miscellaneous goods, steel sheets, cans, electronic boards, electronic components, etc. In particular, the present invention can be used for various products which include a lubricating film, and can be particularly suitably used for manufacturing sliding members equipped with a lubricating film.

EXAMPLES

In the section below, the present invention will be described with reference to examples, but the present invention shall not be limited to said examples.

Example 1 and Comparative Examples 1 to 3

Components were mixed together in the ratios shown in Table 1 to obtain aqueous coating agents (coating compositions for an aqueous lubricating film) in Examples 1 to 3 and Comparative Examples 1 to 2.

Note that the numerical values shown in Table 1 are expressed in terms of parts per mass. Furthermore, for the aqueous polyurethane resin/aqueous polyolefin resin given in the table, which served as the binder corresponding to Component (A) of the present invention, the amounts are given in terms of parts per mass of the solid component (100 parts per mass) and the water in the form of an aqueous emulsion present in Component (A) and Component (E) is included under (F) Water.

[Flow Stability]

The flow stability of the coating agent was determined according to the criteria below and is shown in Table 1.
⊚: Very stable
•: Stable but thickened
Δ: Increased viscosity and gelification after 24 hours
x: Instant gelification
xx: Solid lubricant cannot be dispersed and either undergoes flotation se paration or precipitates out Furthermore, the components and terms used in the table are as follows. Note that, in the table, the value of parts per mass of "water" is given as the sum of components derived from other raw material components.

Aqueous polyurethane resin: An aqueous emulsion of aliphatic polyurethane resin (solid content: 40% by weight)
Sodium dodecylbenzenesulfonate: 50% by weight solid content, manufactured by NOF Corporation
PTFE (polytetrafluoroethylene) powder: Spherical polytetrafluoroethylene resin fine particles having a median diameter of 3 to 5 μm as measured via laser diffraction scattering particle size distribution measurement (solid content: 100% by weight)
PTFE (polytetrafluoroethylene) dispersion: Spherical polytetrafluoroethylene resin fine particles having a median diameter of 0.1 to 1.00 μm as measured via laser diffraction scattering particle size distribution measurement (solid content: 50% by weight)
1,3-dimethyl-2-imidazolidinone: Manufactured by Kawaken Fine Chemical Co., Ltd., DMEU
N-methyl-2-pyrrolidone: Manufactured by BASF Japan Ltd., N-methyl-2-pyrrolidone
N-ethyl-2-pyrrolidone: Manufactured by BASF Japan Ltd., N-ethyl-2-pyrrolidone
Acrylonitrile-butadiene-styrene copolymer (ABS) resin board: Sumitomo B akelite 1 Co., Ltd., TOUGHACE EAR-003
Polycarbonate Resin Board:

Reference Example 1: Preparation of Component (E1)—Film-Forming Silicone Emulsion 37.0 parts hydroxydimethylsiloxy group-endblocked polydimethylsiloxane blocked on both ends having a viscosity of 2,400 mPa·s, 3.0 parts aminoxy group-containing polysiloxane represented by the formula $Et_2NO(Me_2SiO)_7NEt_2$, 1.5 parts polyoxyethylene-polyoxypropylene copolymer-type nonionic emulsifier (product name: Pluronic F108, manufactured by ADEKA), 5.0 parts of a 40% aqueous solution of alkanesulfonic acid sodium salt, and part of 34.4 parts water were uniformly mixed together and fed into a continuous mixing apparatus to perform emulsification. An emulsion obtained from the remainder of the 34.4 parts of water and 17.6 parts colloidal silica (trade name: SNOWTEX 30, manufactured by Nissan Chemical Industries, active ingredient: 30%, pH 10, colloidal silica with surface stabilized by sodium) was diluted, after which 0.5 parts diethylamine was added as a pH adjuster. Additionally, 1.0 part methyltriethoxysilane was added and uniformly mixed in to prepare an oil-in-water silicone emulsion. The average particle diameter of said emulsion measured via dynamic light scattering at 25° C. using a submicron particle analyzer (COULTER MODEL N4 MD, manufactured by Coulter Electronics Co., Ltd.) was 250 nm, and the emulsion was left to stand at 25° C. for 24 hours, after which it was confirmed that a rubber-like film had formed when moisture was removed.

Component (E2): Commercial Product

Film-forming silicone emulsion emulsified with anionic surfactant Product Name: 84 Additive (manufactured by Dow Corning Toray Co., L td.)

<Dimethylpolysiloxane Emulsion for Comparative Experiments>

Component (E'): Non-film-forming silicone emulsion emulsified with an anionic surfactant (emulsion of dimethylpolysiloxane having a viscosity of 1,000,000 mPas at 25° C.)
Product Name: BY22-050 A (manufactured by Dow Corning Toray Co., Ltd.)

Examples 1 to 3

Using the compounding ratios shown in Table 1, 1,3-dimethyl-2-imidazolidinone was added as a solvent to a water-based polyurethane resin emulsion (resin solid content: 40%) and dissolved by stirring and mixing. Thereafter, sodium dodecylbenzenesulfonate, an anionic surfactant, was added under stirring until it was dissolved, after which the aforementioned Component (E1) or Component (E2) and PTFE powder, serving as a solid lubricant, were dispersed. After adding a defoaming agent, the mixture thus obtained was mixed and stirred at 600 rpm for 30 minutes to obtain an aqueous coating agent composition.

Comparative Example 1

An aqueous coating agent composition was obtained in the same manner as in the above Examples with the exception that that the aforementioned Component (E) was not added at the compounding ratios shown in Table 1.

Comparative Example 2

An aqueous coating agent composition was obtained in the same manner as in the above Examples with the exception that a dimethylpolysiloxane emulsion for use in comparative experiments (E') was used in lieu of the aforementioned Component (E) at the compounding ratio shown in Table 1.

[Formation of Lubricating Film]

The aqueous coating agent composition obtained in the Examples shown in Table 1 was used to spray coat the aforementioned acrylonitrile-butadiene-styrene copolymer (ABS) resin board or aforementioned polycarbonate resin such that the film thickness after drying was 10 to 20 In order to evaporate the solvent and water, the film was allowed to stand at 25° C. for 60 minutes and dried and cured to form a lubricating film.

For each example, the friction coefficient of the obtained lubricating film was measured for the ABS resin board. Additionally, the cross-cut adhesion of the obtained lubricating coating was evaluated for the ABS resin board and the polycarbonate resin. The results are shown in Table 1.

<Evaluation Methods>

[Lubricating Film Smoothness (Surface Appearance)]

The water-based coating compositions obtained in each of the Examples and Comparative Examples were each applied to a 20 cm×20 cm (unit area) PET film (Lumirror, manufactured by Toray) via air spraying and left to stand at room temperature for 5 minutes, after which the coating film obtained after drying at 60° C. for 10 minutes was used as a test piece for determining surface appearance. The surface of the lubricating coating on the film was visually observed, and the number of pinholes was evaluated according to the following criteria.

•: No pinholes

Δ: 1 to 30 (exclusive) pinholes per unit area x: 30 or more pinholes per unit area

[Measurement of Static Friction Coefficient and Dynamic Friction Coefficient]

Using a reciprocating friction and abrasion tester which reciprocated a vertically loaded roller over each of the test pieces (ABS) on which the lubricating film had been formed at a sliding speed of 0.01 m/s, a load of 100 g, and a sliding distance (stroke) of 15 mm, the friction coefficient immediately after the start of sliding on the SUJ2 steel roller on the 10th cycle was measured as the static friction coefficient, and the dynamic friction coefficient (units: μ) between 5 and 10 mm was measured thereafter.

[Durability Testing]

Using a reciprocating friction and wear tester produced a reciprocating motion by rotating a roller with a vertical load over each test piece (ABS) on which a lubricating film had been formed at a sliding speed of 0.2 m/s, load of 100 g and sliding distance (stroke) of 40 mm, the increase in the friction coefficient when sliding was performed up to 50,000 cycles was measured and the number of cycles at which the friction coefficient increased to 0.3 was taken as an index of durability. Samples which did not reach a friction coefficient of 0.3 after 50,000 cycles were recorded as >50,000 cycles.

[Crosscut Adhesion Test]

In accordance with JIS K 5400, the coating of each test piece (ABS resin board or PC resin board) on which a lubricating coating had been formed was cut into 100 squares, and a Cellotape® peel test was performed. The number of grids spaces in which the coating remained out of a total of 100 grid spaces was checked and a determination was made based on the following criteria.

⊚ (100)

• (90 to 99)

Δ (50 to 89)

TABLE 1

| Composition/Example/Comparative Example No. | | Example 1 | Example 2 | Example 3 | Comparative Example 1 | Comparative Example 2 |
|---|---|---|---|---|---|---|
| (A) Binder (Solid Content) | Water-based polyurethane resin | 100 | 100 | 100 | 100 | 100 |
| (B) Surfactant | Sodium dodecane sulfonate | 5 | 5 | 5 | 5 | 5 |
| (C) Solid lubricant | PTFE powder (average particle size D50: 3 to 5 μm) | 0 | 0 | 20 | 0 | 0 |
| | PTFE dispersion (average particle diameter D50: 0.1 to 1 μm) | 50 | 50 | 0 | 50 | 50 |
| (E1) | Film-forming silicone emulsion | 5 | 0 | 5 | 0 | 0 |
| (E2) | Film-forming silicone emulsion | 0 | 5 | 0 | 0 | 0 |
| (E') | Dimethylpolysiloxane emulsion for comparative experiments | 0 | 0 | 0 | 0 | 5 |
| Solvent | (D) 1,3-sodium-2-imidazolidinone | 10 | 10 | 10 | 10 | 10 |
| | (D2) N-methyl-2-pyrrolidone | 0 | 0 | 0 | 0 | 0 |
| | (D3) N-ethyl-2-pyrrolidone | 0 | 0 | 0 | 0 | 0 |
| | Triethanolamine | 0 | 0 | 0 | 0 | 0 |
| | Diethanolamine | 0 | 0 | 0 | 0 | 0 |
| | γ-Butyrolactone | 0 | 0 | 0 | 0 | 0 |
| | Benzyl benzoate | 0 | 0 | 0 | 0 | 0 |
| | Methyl ethyl ketone | 0 | 0 | 0 | 0 | 0 |
| | (F) Water | 350 | 350 | 350 | 350 | 350 |
| Liquid Properties | Flow Stability | ◎ | ◎ | ◎ | ◎ | ◎ |
| Coating Appearance | Number of Pinholes on Coating Surface | ○ | ○ | ○ | ○ | × |
| Lubricity | Dynamic Friction Coefficient | 0.12 | 0.11 | 0.15 | 0.11 | 0.14 |
| | Static Friction Coefficient | 0.13 | 0.13 | 0.17 | 0.24 | 0.16 |
| | Δμ | 0.01 | 0.02 | 0.02 | 0.13 | 0.02 |
| Durability | Number of Cycles until Dynamic Friction Coefficient (μ) > 0.3 | >50,000 | >50,000 | >50,000 | 20,000 | >50,000 |
| Crosscut Adhesion | ABS resin substrate | ◎ | ◎ | ◎ | ◎ | ◎ |
| | PC resin substrate | ◎ | ◎ | ◎ | ◎ | ◎ |

What is claimed is:

1. An aqueous coating agent composition comprising:
(A) A curable resin in the form of an aqueous emulsion,
(B) A surfactant,
(C) Solid particles,
(D) One or more types of nitrogen-containing heterocyclic compounds,
(E) A film-forming silicone in the form of an aqueous emulsion, and
(F) Water,
wherein Component (E) corresponds to a film-forming silicone in the form of an aqueous emulsion comprising 100 parts per mass of (Ea) a polyorganosiloxane having at least two hydroxyl groups or hydrolyzable groups bonded to a silicon atom per molecule, 0.1 to 200 parts per mass of (Eb) colloidal silica, 1 to 100 parts per mass of (Ec) ionic surfactant, 0 to 50 parts per mass of (Ed) nonionic surfactant and 10 to 5,200 parts per mass of (Ef) water.

2. The aqueous coating agent composition as specified in claim 1, which includes 0.1 to 50 parts per mass of Component (B), 5 to 200 parts per mass of Component (C), 1 to 20 parts per mass of Component (D), 0.1 to 10 parts per mass of a solid component of Component (E), and 50 to 1,000 parts per mass of Component (F), each per 100 parts per mass of a solid component of Component (A) specified above.

3. The aqueous coating agent composition as specified in claim 1, wherein, in Component (E), the nonionic surfactant corresponding to Component (Ed) is (Ed-1) a polyoxyethylene-polyoxypropylene copolymer-type nonionic surfactant.

4. The aqueous coating agent composition as specified in claim 1, wherein, in Component (E), Component (Ea) corresponds to a polyorganosiloxane having at least two (Ea-1) groups selected from a set comprising a hydroxyl group, an alkoxy group and an alkoxyalkoxy group bonded to a silicon atom.

5. The aqueous coating agent composition as specified in claim 1, wherein Component (E) furthermore corresponds to a film-forming silicone in the form of an aqueous emulsion which includes 0.1 to 100 parts per mass of (Eg) an aminoxy group-containing organosilicon compound having an aminoxy group bonded to a silicon atom.

6. The aqueous coating agent composition as specified in claim 1, wherein Component (E) furthermore corresponds to a film-forming silicone in the form of an aqueous emulsion which includes 0.1 to 50 parts per mass of (Eh) an alkoxysilane or alkoxyalkoxysilane, or a partially hydrolyzed condensate of said alkoxysilane or alkoxyalkoxysilane, as expressed by the formula $R_aSiX_{4-a}$ where R corresponds to an unsubstituted monovalent hydrocarbon group or a substituted monovalent hydrocarbon group, X corresponds to an alkoxy group or an alkoxyalkoxy group, and a corresponds to 0, 1 or 2.

7. The aqueous coating agent composition as specified in claim 1, wherein Component (E) furthermore corresponds to a film-forming silicone in the form of an aqueous emulsion which includes (Ei) an amine compound as a pH adjuster.

8. The aqueous coating agent composition as specified in claim 1, wherein, in Component (E), the colloidal silica corresponding to Component (Eb) is in the form of an aqueous dispersion having a pH of 7.0 or greater which is stabilized with alkali metal ions, ammonium ions or an amine.

9. The aqueous coating agent composition as specified in claim 1, wherein Component (D) specified above corresponds to a nitrogen-containing heterocyclic compound represented by any one of Structural Formulas (D-1) through (D-3) given below

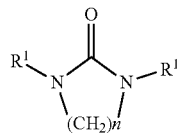
(D-1)

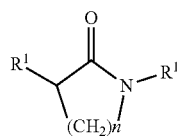
(D-2)

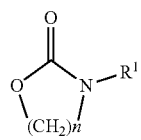
(D-3)

Where $R^1$ corresponds to a hydrogen atom or alkyl groups each independently having 1 to 9 carbon atoms, and n is a number ranging from 1 to 10.

10. An aqueous coating agent composition as specified in claim 1, wherein at least part of the aforementioned Component (C) corresponds to a solid lubricant.

11. A method comprising applying the aqueous coating agent composition as specified in claim 1, as a coating composition for an aqueous lubricating film.

12. An aqueous coating agent composition comprising:
(A) A curable resin in the form of an aqueous emulsion,
(B) 0.1 to 50 parts per mass of a surfactant per 100 parts per mass of a solid component of Component (A),
(C) 5 to 200 parts per mass of solid particles per 100 parts per mass of a solid component of Component (A),
(D) 1 to 20 parts per mass of one or more types of nitrogen-containing heterocyclic compounds per 100 parts per mass of a solid component of Component (A),
(E) 0.1 to 10 parts per mass of a film-forming silicone in the form of an aqueous emulsion per 100 parts per mass of a solid component of Component (A), and
(F) 50 to 1,000 parts per mass of water per 100 parts per mass of a solid component of Component (A),
wherein at least part of the aforementioned Component (C) corresponds to a solid lubricant,
wherein Component (D) specified above corresponds to a nitrogen-containing heterocyclic compound represented by any one of Structural Formulas (D-1) through (D-3) given below

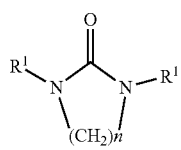
(D-1)

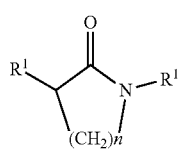
(D-2)

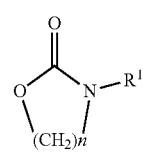
(D-3)

wherein $R^1$ corresponds to a hydrogen atom or alkyl groups each independently having 1 to 9 carbon atoms, and n is a number ranging from 1 to 10, and wherein Component (E) corresponds to a film-forming silicone in the form of an aqueous emulsion comprising 100 parts per mass of (Ea) a polyorganosiloxane having at least two hydroxyl groups or hydrolyzable groups bonded to a silicon atom per molecule, 0.1 to 200 parts per mass of (Eb) colloidal silica, 1 to 100 parts per mass of (Ec) ionic surfactant, 0 to 50 parts per mass of (Ed) nonionic surfactant and 10 to 5,200 parts per mass of (Ef) water.

13. The aqueous coating agent composition as specified in claim 12, wherein, in Component (E), the nonionic surfactant corresponding to Component (Ed) is (Ed-1) a polyoxyethylene-polyoxypropylene copolymer-type nonionic surfactant.

14. The aqueous coating agent composition as specified in claim 12, wherein, in Component (E), Component (Ea) corresponds to a polyorganosiloxane having at least two (Ea-1) groups selected from a set comprising a hydroxyl group, an alkoxy group and an alkoxyalkoxy group bonded to a silicon atom.

15. The aqueous coating agent composition as specified in claim 12, wherein Component (E) furthermore corresponds to a film-forming silicone in the form of an aqueous emulsion which includes 0.1 to 100 parts per mass of (Eg) an aminoxy group-containing organosilicon compound having an aminoxy group bonded to a silicon atom.

16. The aqueous coating agent composition as specified in claim 12, wherein Component (E) furthermore corresponds to a film-forming silicone in the form of an aqueous emulsion which includes 0.1 to 50 parts per mass of (Eh) an alkoxysilane or alkoxyalkoxysilane, or a partially hydrolyzed condensate of said alkoxysilane or alkoxyalkoxysilane, as expressed by the formula $R_aSiX_{4-a}$ where R corresponds to an unsubstituted monovalent hydrocarbon group or a substituted monovalent hydrocarbon group, X corresponds to an alkoxy group or an alkoxyalkoxy group, and a corresponds to 0, 1 or 2.

17. The aqueous coating agent composition as specified in claim 12, wherein Component (E) furthermore corresponds to a film-forming silicone in the form of an aqueous emulsion which includes (Ei) an amine compound as a pH adjuster.

18. The aqueous coating agent composition as specified in claim 12, wherein, in Component (E), the colloidal silica corresponding to Component (Eb) is in the form of an aqueous dispersion having a pH of 7.0 or greater which is stabilized with alkali metal ions, ammonium ions or an amine.

19. A method comprising applying the aqueous coating agent composition as specified in claim 12, as a coating composition for an aqueous lubricating film.

* * * * *